US009626504B2

(12) United States Patent
Tomizawa (10) Patent No.: US 9,626,504 B2
(45) Date of Patent: Apr. 18, 2017

(54) INFORMATION PROCESSING DEVICE AND INFORMATION PROCESSING METHOD (75) Inventor: Hidekazu Tomizawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 14/111,804

(22) PCT Filed: Apr. 11, 2012

(86) PCT No.: PCT/JP2012/059840
§ 371 (c)(1),
(2), (4) Date: Oct. 15, 2013

(87) PCT Pub. No.: WO2012/144380
PCT Pub. Date: Oct. 26, 2012

(65) Prior Publication Data
US 2014/0230014 A1 Aug. 14, 2014

(30) Foreign Application Priority Data

Apr. 22, 2011 (JP) .................... 2011-096439

(51) Int. Cl.
*G06F 7/04* (2006.01)
*G06F 21/44* (2013.01)
*H04L 9/32* (2006.01)
*G06F 21/60* (2013.01)
*G06F 21/79* (2013.01)
*H04L 29/06* (2006.01)

(52) U.S. Cl.
CPC ............ *G06F 21/44* (2013.01); *G06F 21/445* (2013.01); *G06F 21/606* (2013.01); *G06F 21/79* (2013.01); *H04L 9/3242* (2013.01); *H04L 63/12* (2013.01)

(58) Field of Classification Search
CPC ........ G06F 21/60; G06F 12/44; G06F 22/445; G06F 21/606; G06F 21/79; H04L 9/3242; H04L 63/12
See application file for complete search history.

(56) References Cited

U.S. PATENT DOCUMENTS

| 6,275,982 B1 * | 8/2001 | Nassor ................. G06F 9/4425 711/103 |
| 6,336,585 B1 * | 1/2002 | Harada ................ G06K 7/0021 235/380 |
| 7,559,090 B2 * | 7/2009 | Takagi et al. ................... 726/27 |

(Continued)

FOREIGN PATENT DOCUMENTS

| JP | 2004-280401 A | 10/2004 |
| JP | 2005-050320 A | 2/2005 |

(Continued)

*Primary Examiner* — Techane Gergiso
(74) *Attorney, Agent, or Firm* — Chip Law Group (57) ABSTRACT

This technology relates to an information processing device and an information processing method capable of detecting that at least one of data and a parameter of a command is falsified. A command reception unit of an IC card receives a read command from a reader/writer through an antenna. A MAC calculation unit calculates a MAC based on a read address included in a parameter of the read command and read data to be transmitted to the reader/writer. A response transmission unit transmits the read data and the MAC to the reader/writer through the antenna. This technology is applicable to the IC card, for example.

8 Claims, 6 Drawing Sheets

(56) References Cited

U.S. PATENT DOCUMENTS

| | | | |
|---|---|---|---|
| 7,580,519 B1* | 8/2009 | Goh .................................. 380/29 | |
| 8,127,144 B2 | 2/2012 | Isogai et al. | |
| 8,601,285 B2* | 12/2013 | Ekberg et al. ................. 713/193 | |
| 2004/0059925 A1* | 3/2004 | Benhammou et al. ........ 713/189 | |
| 2005/0246546 A1* | 11/2005 | Takagi et al. .................. 713/182 | |
| 2006/0265563 A1* | 11/2006 | Goettfert ............. G06F 12/1408 | |
| | | 711/164 | |
| 2008/0170686 A1* | 7/2008 | Nemoto et al. .................. 380/42 | |
| 2009/0187771 A1* | 7/2009 | McLellan, Jr. ................ 713/193 | |
| 2009/0254761 A1* | 10/2009 | Thiebeauld De La Crouee | |
| | | et al. ............................. 713/193 | |
| 2009/0259850 A1* | 10/2009 | Ishibashi ............... H04L 9/3273 | |
| | | 713/169 | |
| 2010/0096452 A1* | 4/2010 | Habraken ...................... 235/382 | |
| 2011/0083017 A1* | 4/2011 | Ali et al. ....................... 713/185 | |

FOREIGN PATENT DOCUMENTS

| | | |
|---|---|---|
| JP | 2006-099548 A | 4/2006 |
| JP | 2007-133860 A | 5/2007 |
| JP | 2010-141639 A | 6/2010 |
| JP | 2010-198147 A | 9/2010 |

* cited by examiner

INFORMATION PROCESSING DEVICE AND INFORMATION PROCESSING METHOD

CROSS-REFERENCE TO RELATED APPLICATION

The present application is a national phase entry under 35 U.S.C. §371 of International Application No. PCT/JP2012/059840 filed Apr. 11, 2012, published on Oct. 26, 2012 as WO 2012/144380 A1, which claims priority from Japanese Patent Application No. JP 2011-096439 filed in the Japanese Patent Office on Apr. 22, 2011.

TECHNICAL FIELD

This technology relates to an information processing device and an information processing method and especially relates to the information processing device and the information processing method suitably used for detecting falsification of data.

BACKGROUND ART

Conventionally, a message digest is used for detecting the falsification of the data on a transmission path when the data is read from an IC card (for example, refer to Patent Document 1).

CITATION LIST

Patent Document

Patent Document 1: Japanese Patent Application Laid-Open No. 2010-141639

SUMMARY OF THE INVENTION

Problems to be Solved by the Invention

However, a conventional method in which the message digest is used cannot cope with the falsification of a parameter of a command used in communication.

For example, when an address included in a parameter of a read command for reading the data from the IC card is falsified and the data is read from the falsified address, the message digest is generated based on the same data in the IC card and a reader/writer. Therefore, since both message digests conform to each other, it is not possible to detect that another data is read due to the falsification of the address.

An object of this technology is to detect that at least one of the data and the parameter of the command is falsified.

Solutions to Problems

An information processing device according to a first aspect of this technology includes a reception unit which receives a predetermined command from another information processing device, a calculation unit which calculates second data for authentication using a same algorithm as the algorithm of the other information processing device based on at least a part of a parameter of the received command and first data to be transmitted to the other information processing device in response to the command, and a transmission unit which transmits the first data and the second data to the other information processing device.

It is possible that a read control unit which controls reading of data from a storage medium is further provided, the command is made a command including positional information indicating a position from which the first data is read in the parameter for reading the first data from the position indicated by the positional information, the read control unit is allowed to read the first data from the position of the storage medium indicated by the positional information, and the calculation unit is allowed to calculate the second data based on the positional information included in the parameter of the received command and the first data read from the storage medium.

It is possible that the calculation unit is allowed to calculate the second data based on the number of the first data in addition to the positional information and the first data.

An information processing method according to a first aspect of this technology includes the steps of receiving a predetermined command from another information processing device, calculating second data for authentication using a same algorithm as the algorithm of the other information processing device based on at least a part of a parameter of the received command and first data to be transmitted to the other information processing device in response to the command, and transmitting the first data and the second data to the other information processing device.

An information processing device according to a second aspect of this technology includes a transmission unit which transmits a predetermined command to another information processing device, a reception unit which receives first data and second data for authentication calculated by the other information processing device using a predetermined algorithm based on at least a part of a parameter of the received command and the first data transmitted from the other information processing device in response to the command, a calculation unit which calculates third data for authentication by the same algorithm as the algorithm of the other information processing device based on at least a part of the parameter of the command transmitted to the other information processing device and the first data received from the other information processing device, and an authentication unit which authenticates the second data and the third data.

It is possible that the command is made a command including positional information indicating a position from which the first data is read in the parameter for reading the first data from the position indicated by the positional information, the other information processing device is allowed to calculate the second data based on the positional information included in the parameter of the received command and the first data read from the position indicated by the positional information, and the calculation unit is allowed to calculate the third data based on the positional information included in the parameter of the transmitted command and the first data received from the other information processing device.

It is possible that the other information processing device is allowed to calculate the second data based on the number of the first data in addition to the positional information and the first data, and the calculation unit is allowed to calculate the third data based on the number of the first data in addition to the positional information and the first data.

An information processing method according to a second aspect of this technology includes the steps of transmitting a predetermined command to another information processing device, receiving first data and second data for authentication calculated by the other information processing device using a predetermined algorithm based on at least a part of a parameter of the received command and the first data transmitted from the other information processing device in response to the command, calculating third data for authentication using the same algorithm as the algorithm of the other information processing device based on at least a part of the parameter of the command transmitted to the other information processing device and the first data received from the other information processing device, and authenticating the second data and the third data.

An information processing device according to a third aspect of this technology includes a calculation unit which calculates second data for authentication using a same algorithm as the algorithm of another information processing device based on at least a part of a parameter of a command to be transmitted to the other information processing device and first data to be transmitted to the other information processing device together with the command, and a transmission unit which transmits the command, the first data, and the second data to the other information processing device.

It is possible that the command is made a command including positional information indicating a position in which the first data is written in the parameter for writing the first data in the position indicated by the positional information, and the calculation unit is allowed to calculate the second data based on the positional information and the first data.

It is possible that the calculation unit is allowed to calculate the second data based on the number of the first data in addition to the positional information and the first data.

An information processing method according to a third aspect of this technology includes the steps of calculating second data for authentication using a same algorithm as the algorithm of another information device based on at least a part of a parameter of a command to be transmitted to the other information processing device and first data to be transmitted to the other information processing device together with the command, and transmitting the command, the first data, and the second data to the other information processing device.

An information processing device according to a fourth aspect of this technology includes a reception unit which receives a predetermined command, first data, and second data for authentication calculated using a predetermined algorithm based on at least a part of a parameter of the command and the first data transmitted from another information processing device, a calculation unit which calculates third data for authentication using the same algorithm as the algorithm of the other information processing device based on at least a part of the parameter of the received command and the first data, and an authentication unit which authenticates the second data and the third data.

It is possible that a write control unit which controls writing of data in a storage medium, is further provided, the command is made a command including positional information indicating a position in which the first data is written in the parameter for writing the first data in the position indicated by the positional information, the other information processing device is allowed to calculate the second data based on the positional information included in the parameter of the transmitted command and the transmitted first data, and the calculation unit is allowed to calculate the third data based on the positional information included in the parameter of the received command and the received first data.

It is possible that the other information processing device is allowed to calculate the second data based on the number of the first data in addition to the positional information and the first data, and the calculation unit is allowed to calculate the third data based on the number of the first data in addition to the positional information and the first data.

An information processing method according to a fourth aspect of this technology includes the steps of receiving a predetermined command, first data, and second data for authentication calculated using a predetermined algorithm based on at least a part of a parameter of the command and the first data transmitted from another information processing device, calculating third data for authentication using the same algorithm as the algorithm of the other information processing device based on at least a part of the parameter of the received command and the first data, and authenticating the second data and the third data.

According to the first aspect of this technology, a predetermined command is received from the other information processing device, the second data for authentication is calculated using the same algorithm as that of the other information processing device based on at least a part of the parameter of the received command and the first data to be transmitted to the other information processing device in response to the command, and the first data and the second data are transmitted to the other information processing device.

According to the second aspect of this technology, a predetermined command is transmitted to the other information processing device, the first data and the second data for authentication calculated by the other information processing device using a predetermined algorithm based on at least a part of the parameter of the received command and the first data transmitted from the other information processing device in response to the command are received, the third data for authentication is calculated using the same algorithm as that of the other information processing device based on at least a part of the parameter of the command transmitted to the other information processing device and the first data received from the other information processing device, and the second data and the third data are authenticated.

According to the third aspect of this technology, the second data for authentication is calculated using the same algorithm as that of the other information processing device based on at least a part of the parameter of the command to be transmitted to the other information processing device and the first data to be transmitted to the other information processing device together with the command, and the command, the first data, and the second data are transmitted to the other information processing device.

According to the fourth aspect of this technology, a predetermined command, the first data, and the second data for authentication calculated using a predetermined algorithm based on at least a part of the parameter of the command and the first data transmitted from the other information processing device are received, the third data for authentication is calculated using the same algorithm as that of the other information processing device based on at least a part of the parameter of the received command and the first data, and the second data and the third data are authenticated.

Effects of the Invention

According to the first to fourth aspects of this technology, it is possible to detect that at least one of the data and the parameter of the command is falsified.

MODE FOR CARRYING OUT THE INVENTION

A mode for carrying out this technology (hereinafter referred to as an embodiment) is hereinafter described. Meanwhile, it is described in following order.
1. Embodiment
2. Variation

1. Embodiment

Configuration Example of Information Processing System

Figure 1:
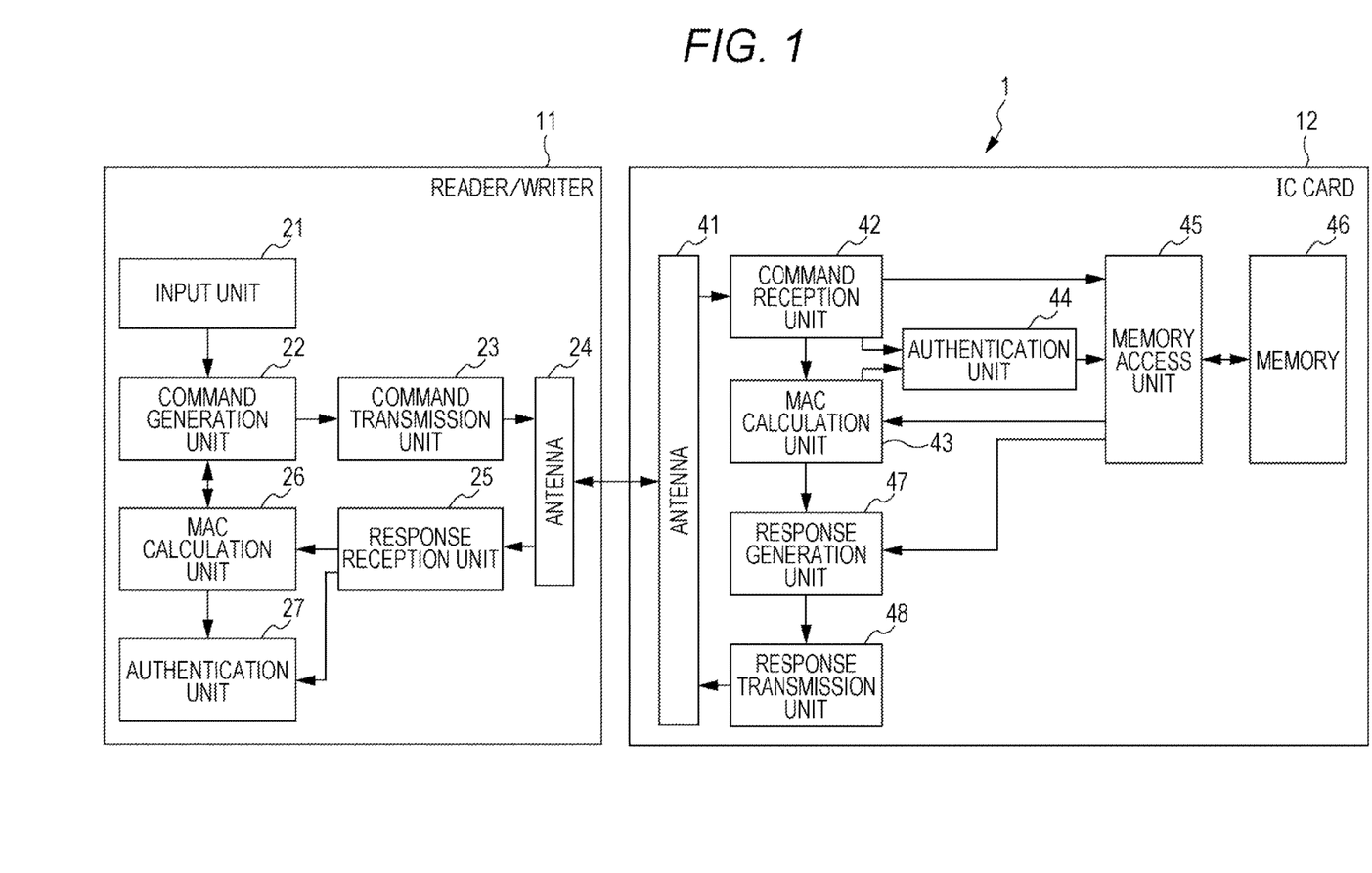
FIG. 1 is a block diagram illustrating one embodiment of an information processing system to which this technology is applied.

FIG. 1 is a block diagram illustrating one embodiment of an information processing system to which this technology is applied.

An information processing system 1 in FIG. 1 is configured to include a reader/writer 11 and an IC card 12.

The reader/writer 11 performs proximity communication with the IC card 12 using a predetermined communication scheme to write data in the IC card 12 or read data from the IC card 12.

Meanwhile, an optional scheme such as NFC (near field communication), for example, may be adopted as the communication scheme between the reader/writer 11 and the IC card 12.

The reader/writer 11 is configured to include an input unit 21, a command generation unit 22, a command transmission unit 23, an antenna 24, a response reception unit 25, a MAC calculation unit 26, and an authentication unit 27.

The input unit 21 composed of an input device such as a button, a key, and a switch, for example, is used for inputting various instructions to the reader/writer 11. The input unit 21 supplies the input instruction and the like to the command generation unit 22.

The command generation unit 22 generates various commands based on the instruction supplied from the input unit 21.

For example, the command generation unit 22 generates a read command for reading the data from a specified address (hereinafter, referred to as a read address) of a memory 46 of the IC card 12. The command generation unit 22 supplies the generated read command to the command transmission unit 23 and supplies the read address to the MAC calculation unit 26.

For example, the command generation unit 22 also generates a write command for writing the data (hereinafter, referred to as write data) in a specified address (hereinafter, referred to as a write address) of the memory 46 of the IC card 12. At that time, the command generation unit 22 supplies the write data and the write address to the MAC calculation unit 26 and allows the same to calculate a MAC (message authentication code) based on the write data and the write address to obtain the calculated MAC. Then, the command generation unit 22 sets the write address as a parameter to generate the write command to which the write data and the MAC are attached and supplies the same to the command transmission unit 23.

The command transmission unit 23 transmits the command supplied from the command generation unit 22 to the IC card 12 through the antenna 24.

The response reception unit 25 receives a response command transmitted from the IC card 12 in response to the command transmitted by the reader/writer 11 through the antenna 24. When the response reception unit 25 receives the response command to the read command, this supplies the data (hereinafter, referred to as read data) read from the memory 46 and the MAC attached to the response command to the MAC calculation unit 26 and the authentication unit 27, respectively.

The MAC calculation unit 26 calculates the MAC using a predetermined algorithm based on the read address supplied from the command generation unit 22 and the read data supplied from the response reception unit 25 and supplies the calculated MAC to the authentication unit 27.

The MAC calculation unit 26 also calculates the MAC using a predetermined algorithm based on the write data and the write address supplied from the command generation unit 22 and supplies the calculated MAC to the command generation unit 22.

The authentication unit 27 authenticates the MAC calculated by the MAC calculation unit 26 and the MAC received from the IC card 12.

The IC card 12 is configured to include an antenna 41, a command reception unit 42, a MAC calculation unit 43, an authentication unit 44, a memory access unit 45, the memory 46, a response generation unit 47, and a response transmission unit 48.

The command reception unit 42 receives the various commands transmitted from the reader/writer 11 through the antenna 41.

When the command reception unit 42 receives the read command, this supplies the read address set in the read command to the memory access unit 45.

Further, when the command reception unit 42 receives the write command, this supplies the write data attached to the write command and the write address set in the write command to the MAC calculation unit 43. The command reception unit 42 also supplies the MAC attached to the write command to the authentication unit 44.

The MAC calculation unit 43 calculates the MAC using the same algorithm as that of the MAC calculation unit 26 of the reader/writer 11 based on the write data and the write address supplied from the command reception unit 42. The MAC calculation unit 43 supplies the calculated MAC and the write data and the write address used in the calculation to the authentication unit 44.

The MAC calculation unit 43 also calculates the MAC using the same algorithm as that of the MAC calculation unit 26 of the reader/writer 11 based on the read address supplied from the command reception unit 42 and the read data supplied from the memory access unit 45. The MAC calculation unit 43 then supplies the calculated MAC to the response generation unit 47.

The authentication unit 44 authenticates the MAC attached to the write command received from the reader/writer 11 and the MAC calculated by the MAC calculation unit 43. When the authentication is successful, the authentication unit 44 supplies the write data and the write address to the memory access unit 45.

The memory access unit 45 controls reading of the data from the memory 46 and writing of the data in the memory 46.

For example, the memory access unit 45 reads the data from the address of the memory 46 indicated by the read address set in the read command and supplies the data, which is read, (read data) to the MAC calculation unit 43 and the response generation unit 47.

For example, the memory access unit 45 writes the write data in the address of the memory 46 indicated by the write address set in the write command and notifies the response generation unit 47 that the writing is completed.

The response generation unit 47 generates the response command to the command received from the reader/writer 11 and supplies the same to the response transmission unit 48.

For example, the response generation unit 47 generates the response command to which the data read from the memory 46 (read data) and the MAC calculated by the MAC calculation unit 43 are attached in response to the read command and supplies the same to the response transmission unit 48.

For example, the response transmission unit 48 also generates the response command for providing notification of completion of the writing of the write data in response to the write command and supplies the same to the response transmission unit 48.

The response transmission unit 48 transmits the response command supplied from the response generation unit 47 to the reader/writer 11 through the antenna 41.

[Configuration Example of Mac Calculation Unit 26]

Figure 2:
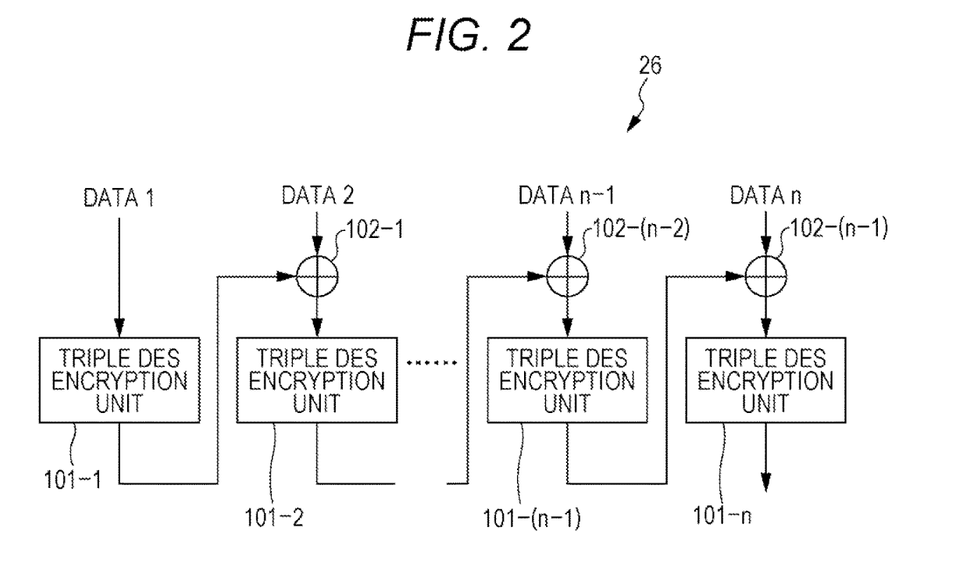
FIG. 2 is a block diagram illustrating a configuration example of an authentication unit.

FIG. 2 is a block diagram illustrating a configuration example of the MAC calculation unit 26 of the reader/writer 11.

The MAC calculation unit 26 calculates the MAC by encrypting the input data using DES-CBC (data encryption standard for cipher block chaining). The MAC calculation unit 26 is configured to include triple DES encryption units 101-1 to 101-$n$ and EXOR calculation units 102-1 to 102-($n$-1).

The MAC calculation unit 26 divides the input data into data of predetermined bytes (for example, 8 bytes) for processing. First data 1 after division is input to the triple DES encryption unit 101-1 and second and subsequent data i (i=2 to n) are input to the EXOR calculation units 102-($i$-1).

The triple DES encryption unit 101-1 encrypts the data 1 using triple DES and supplies obtained encrypted data to the EXOR calculation unit 102-1.

The EXOR calculation unit 102-1 calculates exclusive OR of the encrypted data obtained from the triple DES encryption unit 101-1 and the data 2 and supplies calculated data to the triple DES encryption unit 101-2.

The triple DES encryption unit 101-2 encrypts the data obtained from the EXOR calculation unit 102-1 using the triple DES and supplies the obtained encrypted data to the EXOR calculation unit 102-2.

The EXOR calculation unit 102-2 (not illustrated) calculates exclusive OR of the encrypted data obtained from the triple DES encryption unit 101-2 and the data 3 and supplies calculated data to the triple DES encryption unit 101-3 (not illustrated).

The triple DES encryption unit 101-3 encrypts the data obtained from the EXOR calculation unit 102-2 using the triple DES and supplies the obtained encrypted data to the EXOR calculation unit 102-3 (not illustrated).

The MAC calculation unit 26 repeats the above-described processes until the last n-th data n is encrypted by the triple DES 101-$n$. Then, the MAC calculation unit 26 outputs the encrypted data by the triple DES 101-$n$ as the MAC.

Meanwhile, the MAC calculation unit 43 of the IC card 12 has the same configuration as that of the MAC calculation unit 26 and repeated description is omitted.

The configuration of the MAC calculation unit 26 illustrated in FIG. 2 and that of the MAC calculation unit 43 are exemplary and it is possible to configure them such that the MAC calculation is performed using the algorithm different from the DES-CBC, for example.

[Data Reading Process]

A process performed when the reader/writer 11 reads the data from the IC card 12 is next described with reference to a flowchart in FIG. 3.

Meanwhile, this process is started when an instruction to read the data from the specified address (read address) of the IC card 12 is input to the command generation unit 22 through the input unit 21 of the reader/writer 11, for example.

Figure 3:
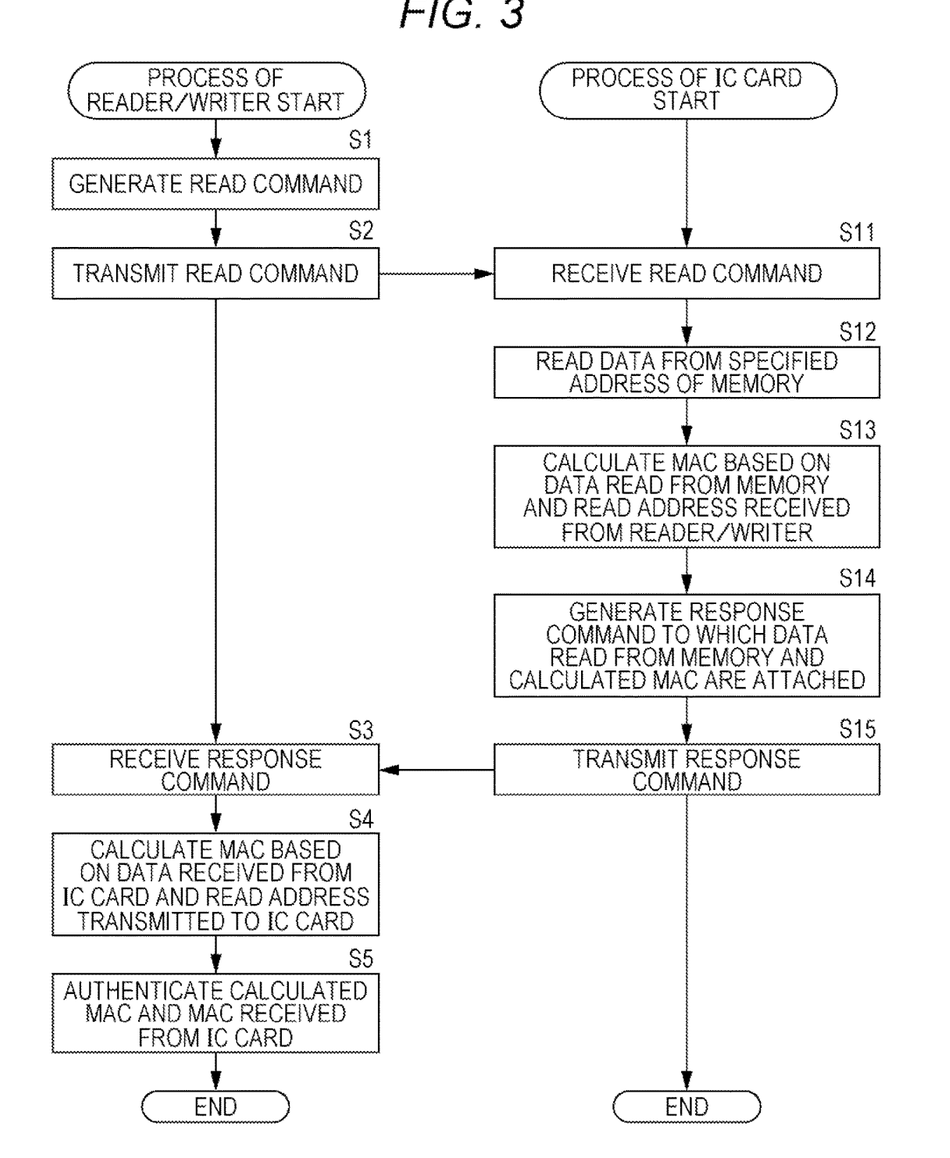
FIG. 3 is a flowchart illustrating a process performed when a reader/writer reads data from an IC card.

Meanwhile, in the flowchart in FIG. 3, a process in which the reader/writer 11 captures the IC card 12 and mutual authentication is performed between the reader/writer 11 and the IC card 12 is not described. It is hereinafter described supposing that an authenticating process between the reader/writer 11 and the IC card 12 is already executed.

At step S1, the command generation unit 22 of the reader/writer 11 generates the read command. Specifically, the command generation unit 22 generates the read command in which the read address obtained from the input unit 21 is set as the parameter. Then, the command generation unit 22 supplies the generated read command to the command transmission unit 23. The command generation unit 22 supplies the read address to the MAC calculation unit 26.

At step S2, the command transmission unit 23 transmits the read command to the IC card 12 through the antenna 24.

At step S11, the command reception unit 42 of the IC card 12 receives the read command transmitted from the reader/writer 11 through the antenna 41. The command reception unit 42 supplies the read address included in the parameter of the received read command to the MAC calculation unit 43 and the memory access unit 45.

At step S12, the memory access unit 45 reads the data from the address of the memory 46 specified by the read command (that is to say, the read address). The memory access unit 45 supplies the data, which is read, (read data) to the MAC calculation unit 43 and the response generation unit 47.

At step S13, the MAC calculation unit 43 calculates the MAC based on the data read from the memory 46 and the read address received from the reader/writer 11. The MAC calculation unit 43 supplies the calculated MAC to the response generation unit 47.

Figure 4:
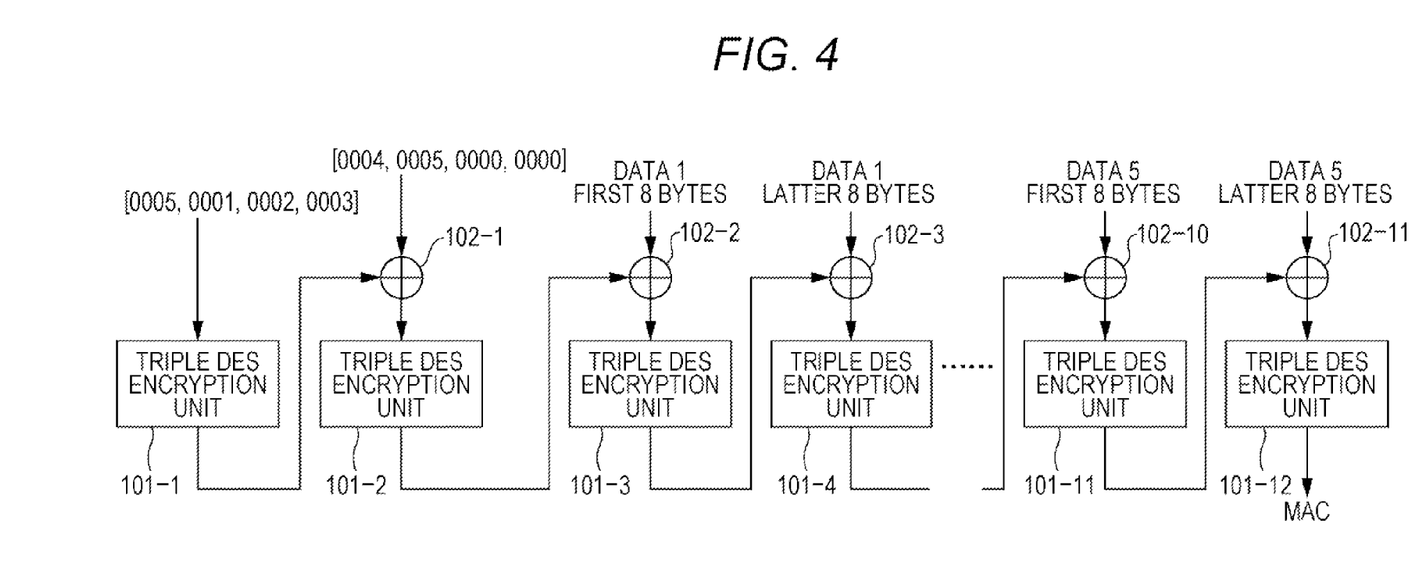
FIG. 4 is a view illustrating a specific example of MAC calculation.

Herein, a specific example of a calculating method of the MAC is described with reference to FIG. 4. Meanwhile, it is hereinafter supposed that addresses 0001 to 0005 of the memory 46 are set in the read command and a total of five data are read from the addresses.

In this case, 8-byte data (0x0005000100020003) formed of the number of the addresses, the reading of the data from which is instructed by the read command, in other words, the number of the read data (0x0005), and first to third values (0x0001, 0x0002, 0x0003) of the addresses from which the data is read is input to the triple DES encryption unit 101-1.

Also, 8-byte data (0x0004000500000000) formed of fourth and fifth values (0004 and 0005) of the addresses from which the data is read and a filler (0x00000000) for making the input data the 8-byte data is input to the EXOR calculation unit 102-1.

First 8 bytes of the data 1 read from the address 0001 are input to the EXOR calculation unit 102-2 and latter 8 bytes of the data 1 are input to the EXOR calculation unit 102-3. First 8 bytes of the data 2 read from the address 0002 are input to the EXOR calculation unit 102-4 (not illustrated) and latter 8 bytes of the data 2 are input to the EXOR calculation unit 102-5 (not illustrated). First 8 bytes of the data 3 read from the address 0003 are input to the EXOR calculation unit 102-6 (not illustrated) and latter 8 bytes of the data 3 are input to the EXOR calculation unit 102-7 (not illustrated). First 8 bytes of the data 4 read from the address 0004 are input to the EXOR calculation unit 102-8 (not illustrated) and latter 8 bytes of the data 4 are input to the EXOR calculation unit 102-9 (not illustrated). First 8 bytes of the data 5 read from the address 0005 are input to the EXOR calculation unit 102-10 and latter 8 bytes of the data 5 are input to the EXOR calculation unit 102-11.

The MAC is calculated based on the read address set in the read command received from the reader/writer 11 and the data read from the memory 46 and the number thereof using the algorithm described above with reference to FIG. 2.

Meanwhile, it is not necessarily required that the number of the read data is used for calculating the MAC. However, when the number of the data is used, an actual address and the filler to make the input data the 8-byte data may be correctly distinguished from each other. For example, in the above-described example, although it is not possible to know whether the data added as the filler is the address or the filler only by its value, it is possible to recognize that this is the filler based on the number of the data.

At step S14, the response generation unit 47 generates the response command to which the data read from the memory 46 and the calculated MAC are attached. That is to say, the response generation unit 47 generates the response command to which the read data read from the memory 46 and the MAC calculated by the MAC calculation unit 43 are attached in response to the read command. Then, the response generation unit 47 supplies the generated response command to the response transmission unit 48.

At step S15, the response transmission unit 48 transmits the response command to the reader/writer 11 through the antenna 41. At that time, the read data attached to the response command is transmitted from the IC card 12 to the reader/writer 11 without being encrypted.

At step S3, the response reception unit 25 of the reader/writer 11 receives the response command from the IC card 12 through the antenna 24. The response reception unit 25 supplies the read data attached to the response command to the MAC calculation unit 26 and supplies the MAC to the authentication unit 27.

At step S4, the MAC calculation unit 26 calculates the MAC based on the data received from the IC card 12 and the read address transmitted to the IC card 12. At that time, the MAC calculation unit 26 calculates the MAC using the same algorithm as that of the MAC calculation unit 43 of the IC card 12. That is to say, the MAC calculation unit 26 calculates the MAC using the algorithm described above with reference to FIG. 4 based on the read address set in the read command transmitted to the IC card, the number of the data, the reading of which is instructed, (=the number of the addresses), and the read data received from the IC card 11. The MAC calculation unit 26 supplies the calculated MAC to the authentication unit 27.

At step S5, the authentication unit 27 authenticates the calculated MAC and the MAC received from the IC card 12. When both of them conform to each other, the authentication unit 27 determines that there is no falsification on a transmission path between the reader/writer 11 and the IC card 12.

On the other hand, when both of them do not conform to each other, the authentication unit 27 determines that there might be the falsification on the transmission path between the reader/writer 11 and the IC card 12. That is to say, the authentication unit 27 determines that at least one of the read address set in the read command and the read data attached to the response command might be falsified on the transmission path between the reader/writer 11 and the IC card 12.

Thereafter, a process to finish the communication between the reader/writer 11 and the IC card 12 is performed and a series of processes is finished.

In this manner, it is possible to easily detect that at least one of the read address set in the read command and the read data attached to the response command is falsified without performing a complicated process.

[Data Writing Process]

A process performed when the reader/writer 11 writes the data in the IC card 12 is next described with reference to a flowchart in FIG. 5.

Meanwhile, this process is started when an instruction to write the input data (write data) in the specified address (write address) of the IC card 12 is input to the command generation unit 22 through the input unit 21 of the reader/writer 11, for example.

Figure 5:
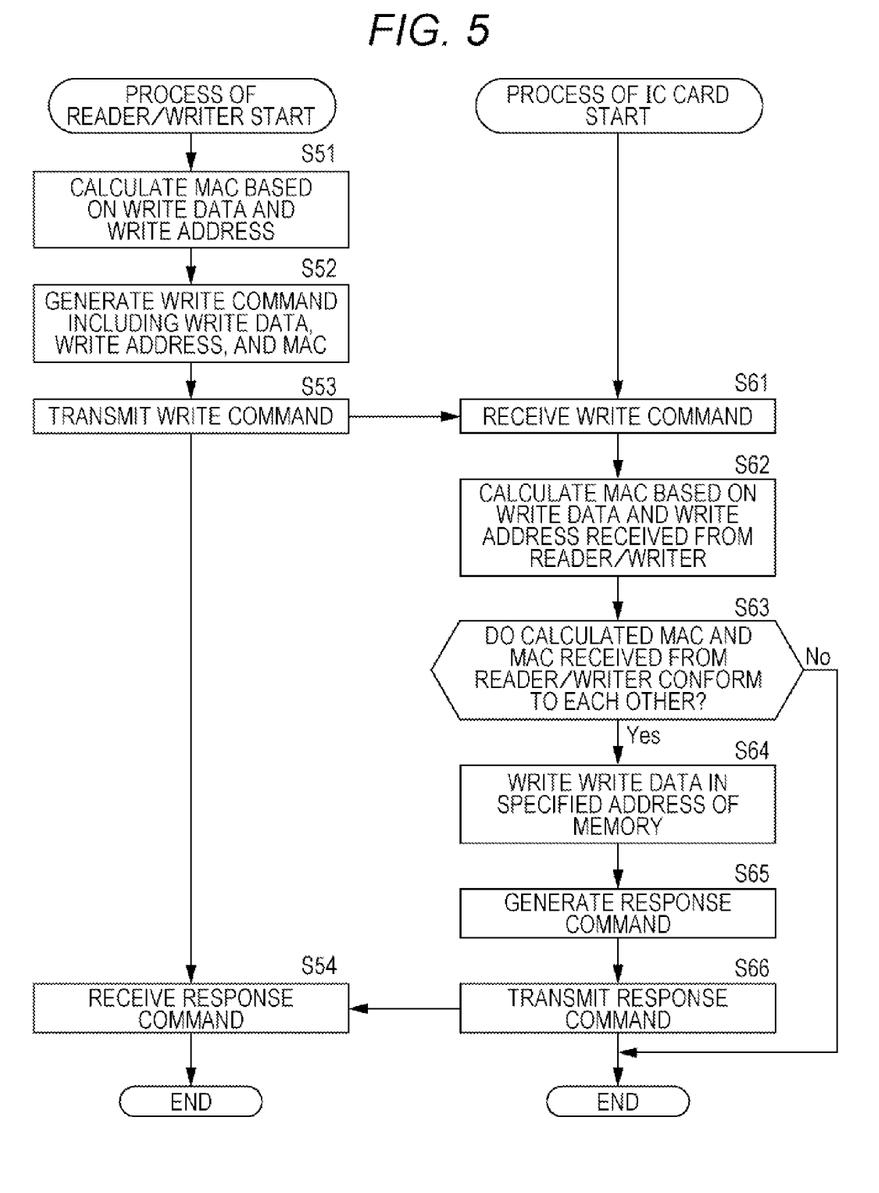
FIG. 5 is a flowchart illustrating a process performed when the reader/writer writes the data in the IC card.

Meanwhile, in the flowchart in FIG. 5, the process in which the reader/writer 11 captures the IC card 12 and the mutual authentication is performed between the reader/writer 11 and the IC card 12 is not described. It is hereinafter described supposing that the authenticating process between the reader/writer 11 and the IC card 12 is already executed.

At step S51, the MAC calculation unit 26 calculates the MAC based on the write data and the write address. Specifically, the command generation unit 22 supplies the write data and the write address obtained from the input unit 21 to the MAC calculation unit 26. The MAC calculation unit 26 calculates the MAC using the algorithm described above with reference to FIG. 4 based on the write data to be transmitted, the number thereof, and the write address. The MAC calculation unit 26 supplies the calculated MAC to the command generation unit 22.

At step S52, the command generation unit 22 generates the write command including the write data, the write address, and the MAC. Specifically, the command generation unit 22 generates the write command in which the write address is set as the parameter and to which the write data and the MAC calculated by the MAC calculation unit 26 are attached. The command generation unit 22 supplies the generated write command to the command transmission unit 23.

At step S53, the command transmission unit 23 transmits the write command to the IC card 12 through the antenna 24. At that time, the write data attached to the write command is transmitted from the reader/writer 11 to the IC card 12 without being encrypted.

At step S61, the command reception unit 42 of the IC card 12 receives the write command transmitted from the reader/writer 11 through the antenna 41. The command reception unit 42 supplies the write address included in the parameter of the received write command and the write data attached to the write command to the MAC calculation unit 43. The command reception unit 42 also supplies the MAC attached to the received write command to the authentication unit 44.

At step S62, the MAC calculation unit 43 calculates the MAC based on the write data and the write address received from the reader/writer 11. At that time, the MAC calculation unit 43 calculates the MAC using the same algorithm as that of the MAC calculation unit 26 of the reader/writer 11. That is to say, the MAC calculation unit 43 calculates the MAC using the algorithm described above with reference to FIG. 4 based on the received write data, the number thereof, and the received write address. The MAC calculation unit 43 supplies the calculated MAC and the write data and the write address used in the calculation to the authentication unit 44.

At step S63, the authentication unit 44 authenticates the calculated MAC and the MAC received from the reader/writer 11 and determines whether they conform to each other. When it is determined that both of them conform to each other, the process shifts to step S64.

At step S64, the memory access unit 45 writes the write data in the specified address of the memory 46. Specifically, the authentication unit 44 supplies the write data and the write address to the memory access unit 45. The memory access unit 45 writes the write data in the address of the memory 46 indicated by the write address. The memory access unit 45 notifies the response generation unit 47 that the writing is completed.

At step S65, the response generation unit 47 generates the response command for providing notification that the writing of the data is completed in response to the write command. Then, the response generation unit 47 supplies the generated response command to the response transmission unit 48.

At step S66, the response transmission unit 48 transmits the response command to the reader/writer 11 through the antenna 41.

At step S54, the response reception unit 25 of the reader/writer 11 receives the response command transmitted from the IC card 12 through the antenna 24.

Thereafter, the process to finish the communication between the reader/writer 11 and the IC card 12 is performed and a series of processes is finished.

On the other hand, when the authentication unit 44 of the IC card 12 determines that the calculated MAC and the MAC received from the reader/writer 11 do not conform to each other at step S63, the processes from step S64 to step S66 are skipped and the process of the IC card 12 is finished.

That is to say, in this case, at least one of the write address set in the write command and the write data attached thereto might be falsified on the transmission path between the reader/writer 11 and the IC card 12. Therefore, the data is not written in the memory 46 and a series of processes is finished.

In this manner, it is possible to easily detect that at least one of the write address set in the write command and the write data attached thereto is falsified without performing the complicated process.

2. Variations

Variations of the embodiment of this technology are hereinafter described.

[First Variation]

Although an example in which this technology is applied to both of reading and writing of data is described above, it is also possible to apply the same to only one of them. For example, in a system in which the data is not written, this technology may be applied only when the data is read.

[Second Variation]

This technology is not limited to communication between a reader/writer 11 and an IC card 12 described above and may be applied to the communication between various devices. For example, this may be applied to the communication using an IC chip capable of performing proximity communication or various devices on which the IC chip is mounted (for example, an IC tag, a mobile phone, a mobile information terminal and the like) in place of the IC card 12. For example, this may also be applied to the communication using the device having an external storage medium in addition to the device in which a storage medium is embedded such as the IC card 12.

Further, the communication scheme is not limited to the proximity communication and an optional communication scheme may be adopted regardless of whether this is a wired or wireless communication scheme.

[Third Variation]

Positional information such as a read address and a write address set in a command whose falsification is to be detected may be in an optional mode.

For example, it is possible to individually specify all the addresses, or specify a range of the addresses by a starting address and an ending address or by the starting address and the number of addresses. For example, any of an absolute address and a relative address may be used. Further, it is possible to indicate a position in a unit other than the address such as a block number and a domain name, for example.

[Fourth Variation]

Further, although an example in which falsification of a read address or a write address is to be detected is described above, this technology may also be applied to a case in which the falsification of a parameter other than this is detected.

For example, in a case in which an address from which reading is started, the number of data to be read, and a direction in which the data is read (increasing order or decreasing order of addresses) are set in a read command as the parameters, it becomes possible to detect the falsification of all the parameters by calculating a MAC using all the parameters.

[Fifth Variation]

In this technology, it is not necessarily required to use all parameters of a command for calculating a MAC and it is possible to calculate using at least a part thereof (for example, only the parameter whose falsification is wanted to be detected).

[Sixth Variation]

For example, it is also possible that, when a reader/writer 11 writes data in an IC card 12, a counter held by the IC card 12 is incremented and the MAC is calculated also using a value of the counter. For example, it is also possible that the reader/writer 11 reads the value of the counter from the IC card 12 before calculating the MAC and calculates the MAC based on write data, write address, and the read value of the counter.

[Seventh Variation]

Further, an algorithm of MAC calculation described above is an example and it is possible to adopt another algorithm with a higher security level.

It is also possible to adopt data calculated using the algorithm with the higher security level shared by a transmission side and a reception side in addition to the above-described MAC as data for authentication used for detecting falsification.

Further, any of a common key encryption scheme and a public key encryption scheme may be adopted as an arithmetic algorithm of the data for authentication. Meanwhile, when the public key encryption scheme is adopted, it may be configured such that the transmission side of the data for authentication calculates using a secret key and the reception side calculates using a public key.

Alternatively, it is also possible to calculate the data for authentication using a session key generated for each session and shared by the transmission side and the reception side.

Meanwhile, an optional method may be adopted as a method of generating the session key. For example, it is possible that a reader/writer 11 writes a random number in an IC card 12 and the IC card 12 generates the session key based on the random number in an information processing system 1. The generated session key is valid until a power supply is shut down or the random number is written again in the IC card 12, for example.

It is also possible to adopt the algorithm without using the key as the arithmetic algorithm of the data for authentication. However, in this case, it is required to encrypt obtained data for authentication by any of the common key encryption scheme and the public key encryption scheme to transmit. Meanwhile, when the public key encryption scheme is adopted, it may be configured such that the transmission side of the data for authentication encrypts using the secret key and the reception side decodes using the public key.

[Eighth Variation]

Further, this technology may also be applied to a case in which data is encrypted to be transmitted and received. In this case, possibility that the data is falsified on a transmission path decreases, so that it is possible to detect that it is highly possible that a parameter of a command is falsified when data for authentication do not conform to each other.

[Configuration Example of Computer]

The above-described series of processes may be executed by hardware or by software. When a series of processes is executed by the software, a program which composes the software is installed on a computer. Herein, the computer includes a computer embedded in dedicated hardware, a general-purpose personal computer, for example, capable of executing various functions with various programs installed and the like.

Figure 6:
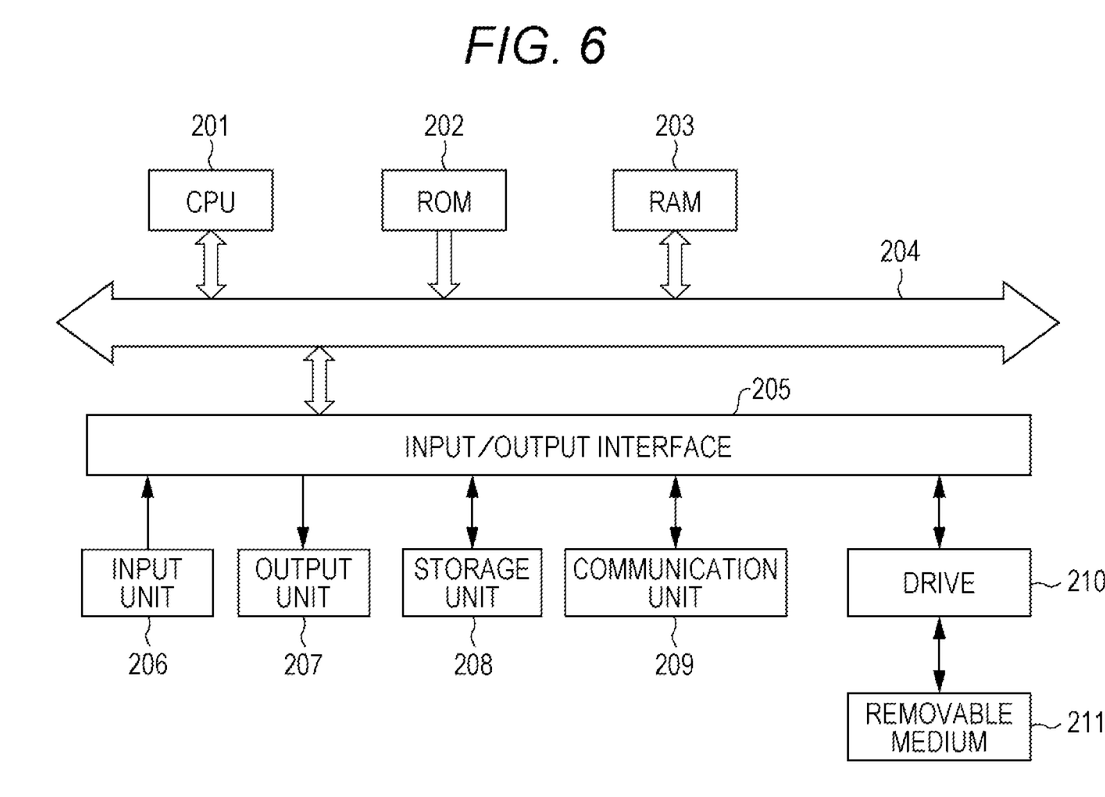
FIG. 6 is a block diagram illustrating a configuration example of a computer.

FIG. 6 is a block diagram illustrating a configuration example of the hardware of the computer which executes the above-described series of processes by the program.

In the computer, a CPU (central processing unit) 201, a ROM (read only memory) 202, and a RAM (random access memory) 203 are connected to one another through a bus 204.

An input/output interface 205 is further connected to the bus 204. An input unit 206, an output unit 207, a storage unit 208, a communication unit 209, and a drive 210 are connected to the input/output interface 205.

The input unit 206 is composed of a keyboard, a mouse, a microphone and the like. The output unit 207 is composed of a display, a speaker and the like. The storage unit 208 is composed of a hard disk, a nonvolatile memory and the like. The communication unit 209 is composed of a network interface and the like. The drive 210 drives a removable medium 211 such as a magnetic disk, an optical disk, a magnetooptical disk, and a semiconductor memory.

In the computer configured as described above, the CPU 201 loads the program stored in the storage unit 208 on the RAM 203 through the input/output interface 205 and the bus 204 to execute, for example, and according to this, the above-described series of processes is performed.

The program executed by the computer (CPU 201) may be recorded on a removable medium 211 as a packaged medium and the like to be provided, for example. The program may be provided through a wired or wireless transmission medium such as a local area network, the Internet, digital satellite broadcasting and the like.

In the computer, the program may be installed on the storage unit 208 through the input/output interface 205 by mounting the removable medium 211 on the drive 210. Also, the program may be received by the communication unit 209 through the wired or wireless transmission medium to be installed on the storage unit 208. In addition, the program may be installed in advance on the ROM 202 and the storage unit 208.

Meanwhile, the program executed by the computer may be the program whose process is performed in chronological order in the order described in this specification or may be the program whose process is performed in parallel or when required such as when a call is issued.

In this specification, the term "system" is intended to mean an overall device composed of a plurality of devices, means and the like.

Further, the embodiment of this technology is not limited to the above-described embodiment and various modifications may be made without departing from the scope of this technology.

REFERENCE SIGNS LIST 1 information processing system, 11 reader/writer, 12 IC card, 22 command generation unit, 23 command transmission unit, 25 response reception unit, 26 MAC calculation unit, 27 authentication unit, 42 command reception unit, 43 MAC calculation unit, 44 authentication unit, 45 memory access unit, 46 memory, 47 response generation unit, 48 response transmission unit

The invention claimed is:

1. A first information processing device, comprising:
one or more processors configured to:
   receive a command from a second information processing device;
   calculate second data for authentication based on at least a part of a parameter of the received command and first data, wherein the received command indicates a start address from which the first data is to be read, a number of addresses of the first data to be read, and an order of addresses in which the first data is to be read from a plurality of addresses in a storage medium; and
   transmit the first data and the second data to the second information processing device.

2. The first information processing device according to claim 1,
wherein the plurality of addresses are indicated by positional information included in the parameter of the received command, and
wherein the one or more processors are further configured to calculate the second data based on the positional information included in the parameter of the received command and the first data read from the storage medium.

3. The first information processing device according to claim 2, wherein the one or more processors are further configured to calculate the second data based on a determined number of the first data, the positional information and the first data.

4. An information processing method, comprising:
in a first information processing device:
receiving a command from a second information processing device;
calculating second data for authentication based on at least a part of a parameter of the received command and first data, wherein the received command indicates a start address from which the first data is to be read, a number of addresses of the first data to be read, and an order of addresses in which the first data is to be read from a plurality of addresses in a storage medium; and
transmitting the first data and the second data to the second information processing device.

5. A first information processing device, comprising:
one or more processors configured to:
calculate second data for authentication based on at least a part of a parameter of a command to be transmitted to a second information processing device and first data to be transmitted to the second information processing device together with the command, wherein the command indicates a start address from which the first data is to be read, a number of addresses of the first data to be read, and an order of addresses in which the first data is to be read from a plurality of addresses in a storage medium; and
transmit the command, the first data, and the second data to the second information processing device.

6. The first information processing device according to claim 5, wherein the one or more processors are further configured to calculate the second data based on positional information included in the parameter of the command and the first data.

7. The first information processing device according to claim 6, wherein the one or more processors are further configured to calculate the second data based on a number of the first data, the positional information and the first data.

8. An information processing method, comprising:
in a first information processing device:
calculating second data for authentication based on at least a part of a parameter of a command to be transmitted to a second information processing device and first data to be transmitted to the second information processing device together with the command,
wherein the command indicates a start address from which the first data is to be read, a number of addresses of the first data to be read, and an order of addresses in which the first data is to be read from a plurality of addresses in a storage medium; and
transmitting the command, the first data, and the second data to the second information processing device.

* * * * *